United States Patent
Khatri et al.

(10) Patent No.: US 10,884,464 B2
(45) Date of Patent: Jan. 5, 2021

(54) SYSTEMS AND METHODS FOR THERMAL THROTTLING VIA PROCESSOR CORE COUNT REDUCTION AND THERMAL LOAD LINE SHIFT

(71) Applicant: Dell Products L.P., Round Rock, TX (US)

(72) Inventors: Mukund P. Khatri, Austin, TX (US); William K. Coxe, Round Rock, TX (US); Robert B. Curtis, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 226 days.

(21) Appl. No.: 15/638,812

(22) Filed: Jun. 30, 2017

(65) Prior Publication Data

US 2019/0004575 A1 Jan. 3, 2019

(51) Int. Cl.
| | | |
|---|---|---|
| *G06F 1/32* | (2019.01) | |
| *G06F 1/20* | (2006.01) | |
| *G06F 1/3234* | (2019.01) | |
| G06F 11/30 | (2006.01) | |
| G06F 1/324 | (2019.01) | |
| G06F 1/3287 | (2019.01) | |

(52) U.S. Cl.
CPC ............ *G06F 1/206* (2013.01); *G06F 1/3234* (2013.01); *G06F 1/324* (2013.01); *G06F 1/3287* (2013.01); *G06F 11/3024* (2013.01); *G06F 11/3058* (2013.01)

(58) Field of Classification Search
CPC ..... G06F 1/32; G06F 1/26; G06F 1/28; G06F 1/00
See application file for complete search history.

(56) References Cited

U.S. PATENT DOCUMENTS

| | | | | |
|---|---|---|---|---|
| 2009/0309243 A1* | 12/2009 | Carmack | ................. | G06F 1/206 |
| | | | | 257/798 |
| 2011/0191059 A1* | 8/2011 | Farrell | ............... | A61B 5/14532 |
| | | | | 702/130 |
| 2011/0208911 A1* | 8/2011 | Taguchi | ................ | G06F 1/3221 |
| | | | | 711/114 |
| 2012/0005505 A1* | 1/2012 | Tolia | ....................... | G06F 1/206 |
| | | | | 713/320 |

(Continued)

*Primary Examiner* — Keshab R Pandey
(74) *Attorney, Agent, or Firm* — Jackson Walker L.L.P.

(57) ABSTRACT

An information handling system may include a processor having a plurality of cores integrated within an integrated circuit package and a thermal controller communicatively coupled to the processor and configured to, responsive to absence of a condition for operating the processor with a reduced core count, control the processor in accordance with a standard thermal profile defining a maximum operating temperature of the processor as a function of power consumed by the processor, and responsive to presence of the condition for operating the processor with the reduced core count, control the processor in accordance with a modified thermal profile defining a modified maximum operating temperature of the processor as a function of power consumed by the processor, wherein for a given power consumption of the processor, the modified thermal profile defines a modified maximum temperature that is greater than the maximum operating temperature defined by the standard thermal profile.

14 Claims, 2 Drawing Sheets

(56) References Cited

U.S. PATENT DOCUMENTS

| | | | |
|---|---|---|---|
| 2012/0066535 A1* | 3/2012 | Naffziger | G06F 1/206 713/340 |
| 2013/0318372 A1* | 11/2013 | Osborn | G06F 1/3203 713/320 |
| 2013/0346778 A1* | 12/2013 | Boom | G06F 1/32 713/323 |
| 2016/0352286 A1* | 12/2016 | Hajimiri | H01L 23/58 |
| 2017/0031417 A1* | 2/2017 | Allen-Ware | G06F 1/324 |

* cited by examiner

SYSTEMS AND METHODS FOR THERMAL THROTTLING VIA PROCESSOR CORE COUNT REDUCTION AND THERMAL LOAD LINE SHIFT

TECHNICAL FIELD

The present disclosure relates in general to information handling systems, and more particularly to thermal management in an information handling system having a multi-core processor.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To maximize processing throughput, an operating system executing on an information handling system may be capable of scheduling threads among a plurality of cores of a multi-core processor. Higher-end processors having many cores often require lower operating temperatures in order to maintain higher frequencies. In dense systems with many components, the lower operating temperatures may be difficult to achieve, requiring sophisticated non-standard cooling solutions. Such sophisticated cooling solutions may impact an information handling system's ability to support other features or components. For example, such cooling solutions may require usage of massive heatsinks which use space that could otherwise be used by other components.

SUMMARY

In accordance with the teachings of the present disclosure, the disadvantages and problems associated with thermal control in a multi-core processor may be substantially reduced or eliminated.

In accordance with embodiments of the present disclosure, an information handling system may include a processor having a plurality of cores integrated within an integrated circuit package and a thermal controller communicatively coupled to the processor and configured to, responsive to absence of a condition for operating the processor with a reduced core count, control the processor in accordance with a standard thermal profile defining a maximum operating temperature of the processor as a function of power consumed by the processor, and responsive to presence of the condition for operating the processor with the reduced core count, control the processor in accordance with a modified thermal profile defining a modified maximum operating temperature of the processor as a function of power consumed by the processor, wherein for a given power consumption of the processor, the modified thermal profile defines a modified maximum temperature that is greater than the maximum operating temperature defined by the standard thermal profile.

In accordance with these and other embodiments of the present disclosure, a method may include, in an information handling system comprising a processor having a plurality of cores integrated within an integrated circuit package, responsive to absence of a condition for operating the processor with a reduced core count, controlling the processor in accordance with a standard thermal profile defining a maximum operating temperature of the processor as a function of power consumed by the processor, and responsive to presence of the condition for operating the processor with the reduced core count, controlling the processor in accordance with a modified thermal profile defining a modified maximum operating temperature of the processor as a function of power consumed by the processor, wherein for a given power consumption of the processor, the modified thermal profile defines a modified maximum temperature that is greater than the maximum operating temperature defined by the standard thermal profile.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to: responsive to absence of a condition for operating a processor having a plurality of cores integrated within an integrated circuit package with a reduced core count, controlling the processor in accordance with a standard thermal profile defining a maximum operating temperature of the processor as a function of power consumed by the processor; and responsive to presence of the condition for operating the processor with the reduced core count, controlling the processor in accordance with a modified thermal profile defining a modified maximum operating temperature of the processor as a function of power consumed by the processor, wherein for a given power consumption of the processor, the modified thermal profile defines a modified maximum temperature that is greater than the maximum operating temperature defined by the standard thermal profile.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
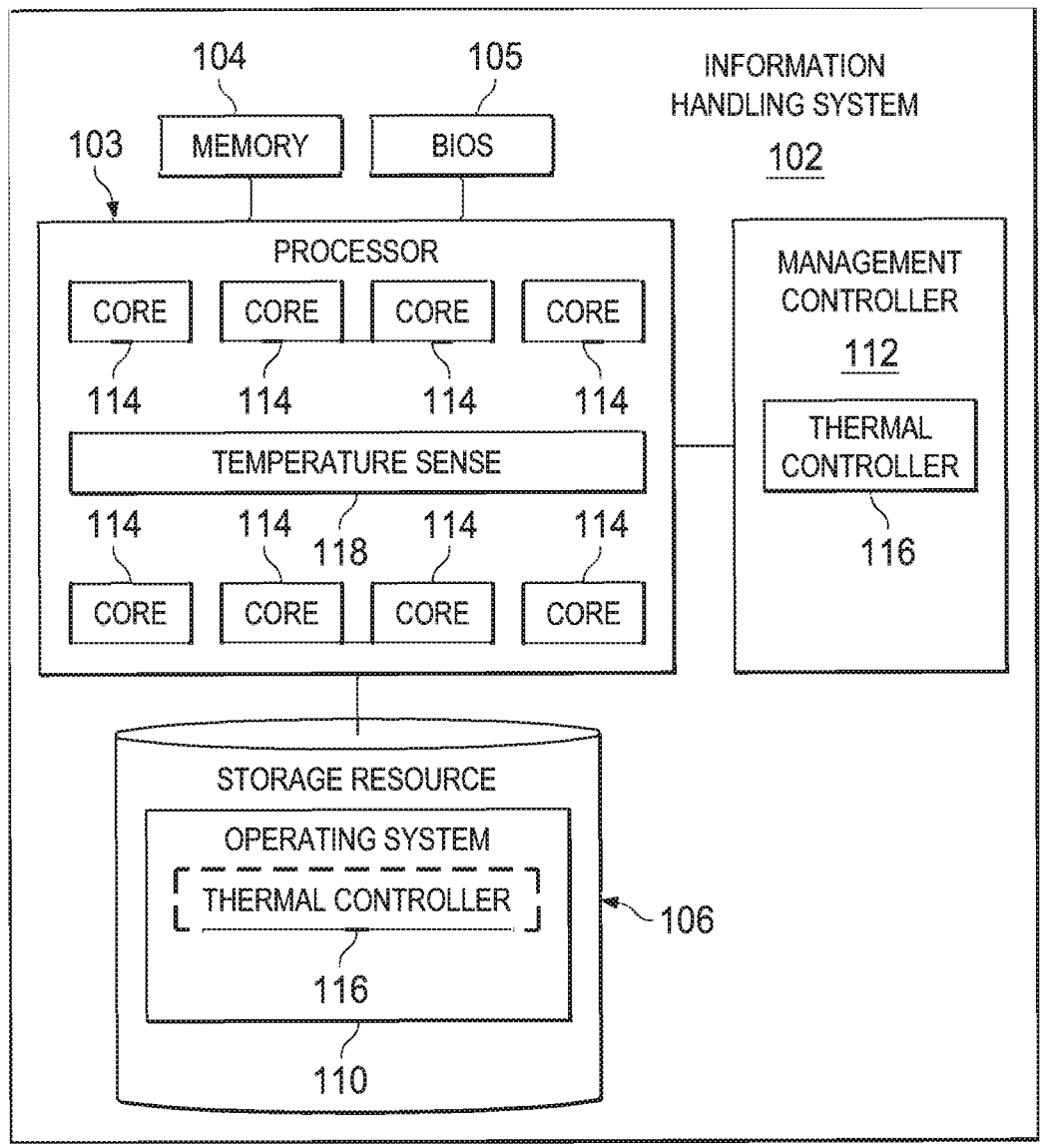
FIG. 1 illustrates a block diagram of an example information handling system, in accordance with embodiments of the present disclosure.
Figure 2:
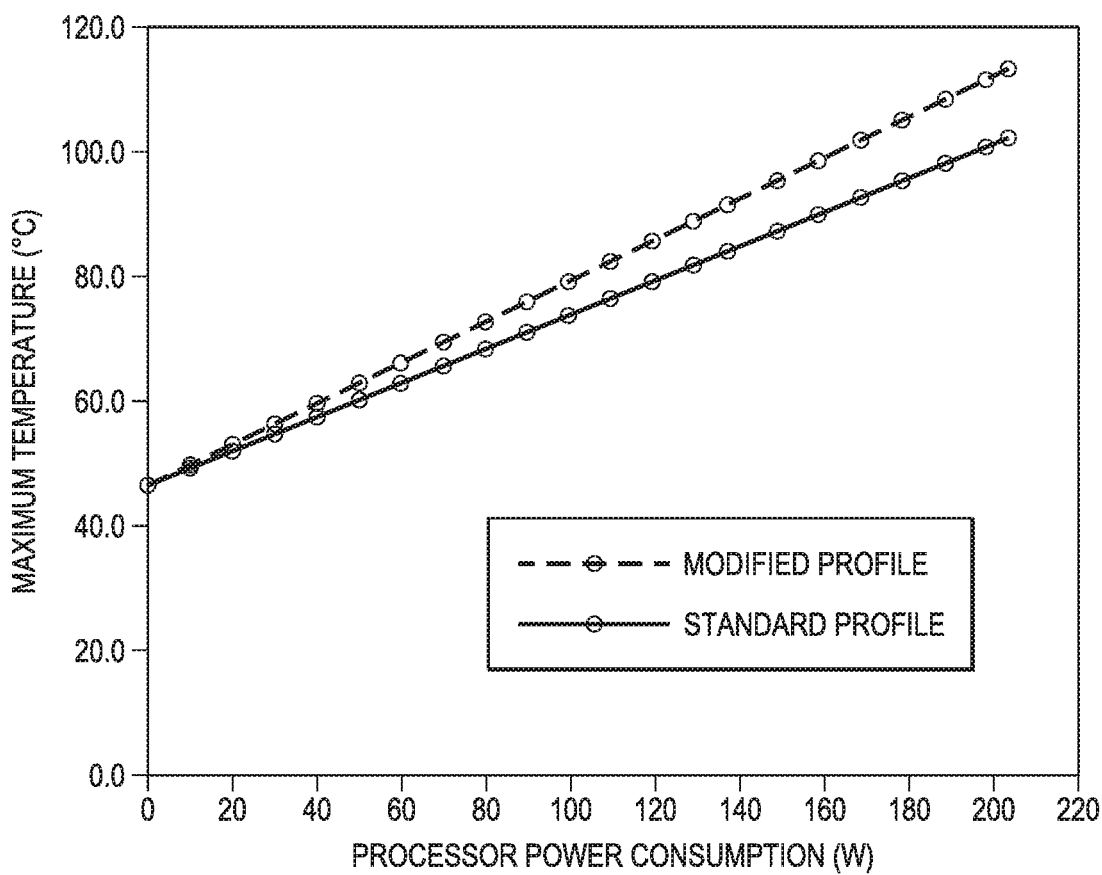
FIG. 2 illustrates a graph depicting example thermal profiles for the processor of FIG. 1, in accordance with embodiments of the present disclosure.
Figure 3:
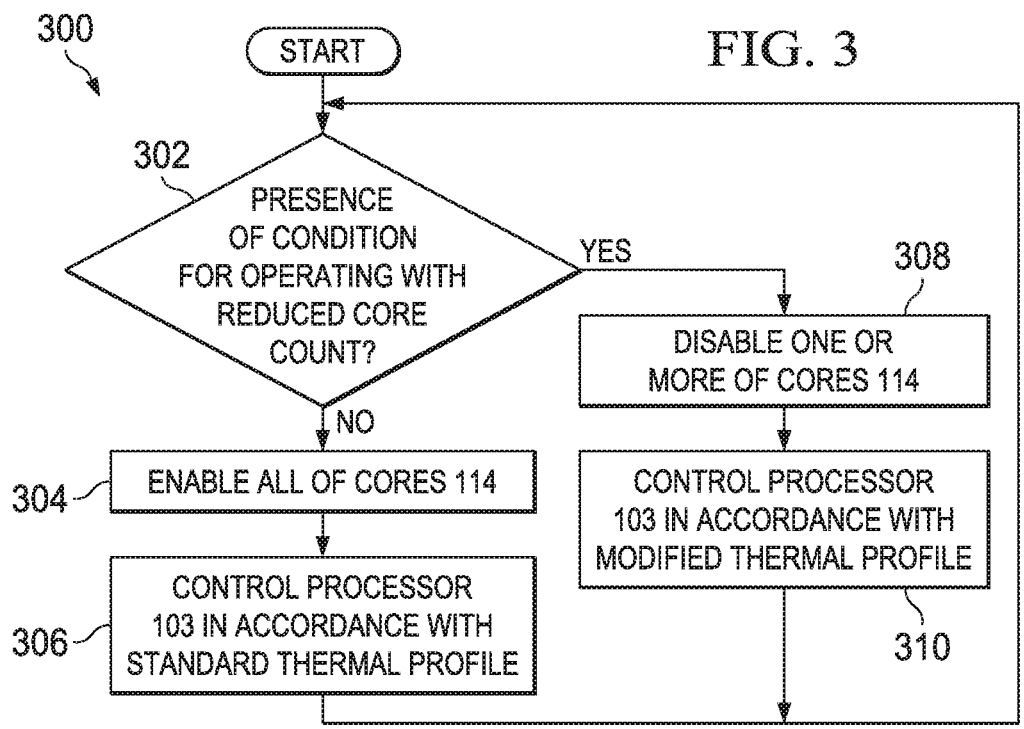
FIG. 3 illustrates a flow chart of an example method for thermal control of a multi-core processor, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a mobile device sized and shaped to be readily transportable on the person of a user (e.g., a mobile phone, tablet, personal digital assistant, digital music player, etc.). In yet other embodiments, information handling system 102 may comprise a storage enclosure configured to house a plurality of physical disk drives and/or other computer-readable media for storing data. As shown in FIG. 1, information handling system 102 may comprise a processor 103, a memory 104, a BIOS 105, a storage resource 106, and a management controller 112.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, and/or another component of information handling system 102. In these and other embodiments, processor 103 may comprise a multi-core processor, as described in greater detail below.

As shown in FIG. 1, processor 103 may comprise a plurality of cores 114, each core 114 integrated or formed on the same integrated circuit die or onto multiple dies in a single chip package. Each core 114 may comprise an independent actual central processing unit to read and execute program instructions, and cores 114 may operate in parallel to execute multiple instructions simultaneously on processor 103. Thus, at the direction of a thread scheduler (e.g., implemented by an operating system of information handling system 102), each of one or more threads of executable instructions may be scheduled for execution on a particular core 114.

As also depicted in FIG. 1, each processor 103 may include a temperature sensor 118. A temperature sensor 118 may be any system, device, or apparatus (e.g., a thermometer, thermistor, etc.) configured to communicate a signal (e.g., to thermal controller 116) indicative of a temperature within or proximate to processor 103.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Storage resource 106 may be communicatively coupled to processor 103. Storage resource 106 may include any system, device, or apparatus operable to store information processed by processor 103. Storage resource 106 may include, for example, network attached storage, one or more direct access storage devices (e.g., hard disk drives), and/or one or more sequential access storage devices (e.g., tape drives). As shown in FIG. 1, storage resource 106 may have stored thereon an operating system 110. Operating system 110 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by operating system 110. Active portions of operating system 110 may be transferred to memory 104 for execution by processor 103.

Management controller 112 may be communicatively coupled to processor 103 and may include any system, device, or apparatus configured to provide out-of-band management facilities for management of information handling system 102. Such management may be made by management controller 112 even if information handling system 102 is powered off or powered to a standby state. Management controller 112 may include a processor, memory, an out-of-band network interface separate from and physically isolated from an in-band network interface of information handling system 102, and/or other embedded information handling resources. In certain embodiments, management controller 112 may include or may be an integral part of a baseboard management controller (BMC) or a remote access controller (e.g., a Dell Remote Access Controller or Integrated Dell Remote Access Controller). In other embodiments, management controller 112 may include or may be an integral part of a chassis management controller (CMC).

As shown in FIG. 1, management controller 112 may include a thermal controller 116. Thermal controller 116 may include a program of executable instructions configured to be read and executed by management controller 112 in order to provide thermal control of processor 103, as described in greater detail below. Although thermal controller 116 is shown in FIG. 1 as being embodied in management controller 112, in other embodiments, thermal controller 116 may be implemented in operating system 110, as indicated in FIG. 1 by the rectangle having dashed borders.

In addition to processor 103, memory 104, BIOS 105, storage resource 106, and management controller 112, information handling system 102 may include one or more other information handling resources.

In standard operation, all cores 114 of processor 103 may be enabled and thermal controller 116 may operate to ensure that a temperature sensed by temperature sensor 118 remains below a maximum temperature as defined by a standard thermal profile. To illustrate, FIG. 2 depicts a graph depicting example thermal profiles for processor 103, including a thermal profile labeled as a "standard profile" defining a maximum temperature to be sensed by temperature sensor 118 as a function of power consumed by processor 103. Thus, in the event that a temperature sensed by temperature sensor 118 exceeds a maximum temperature for a given level of power consumption as defined by the standard thermal profile, thermal controller 116 may take steps to reduce the temperature sensed by temperature sensor 118, such as, for example, throttling (e.g., reducing the clock frequency of) the various cores 114 of processor 103 and/or increasing speed(s) of air mover(s) (e.g., fans or blowers, not explicitly shown in FIG. 1).

However, in addition to the foregoing "standard" operation, thermal controller 116 may also operate in accordance with a modified thermal profile in which one or more cores 114 are disabled from operation. Such disabling of one or more cores 114 may be in response to a user configuration (e.g., via a user configuration made in BIOS 105, operating system 110, and/or management controller 112) or may occur automatically in response to one or more stimuli. Such stimuli may include a processing workload falling below a threshold workload level, a temperature sensed by temperature sensor 118 exceeding a maximum temperature as defined by the standard thermal profile, and/or other suitable stimulus. In response to disabling of one or more cores 114, thermal controller 116 may operate in accordance with a modified thermal profile, an example of which is depicted with dashed lines in FIG. 2. As shown in FIG. 2, the modified thermal profile may allow operation at higher maximum temperatures for a given power consumption of processor 103 as compared to the standard thermal profile. Thus, by reducing a number of active cores 114, a user may be able to operate the remaining cores 114 at unthrottled clock rates. In addition, processor 103 may be operated with the modified thermal profile in a configuration or environment that would not be suitable for operation in the standard thermal profile without exceeding thermal requirements of the standard thermal profile, this enabling processor 103 to run at a higher temperature to allow it to operate in a thermally-challenged configuration or environment.

FIG. 3 illustrates a flow chart of an example method 300 for thermal control of a multi-core processor (e.g., processor 103), in accordance with embodiments of the present disclosure. According to one or more embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, thermal controller 116 may determine if a condition for operating with a reduced core count exists. An example of a condition for operating with a reduced core count is a user configuration to operate with a reduced core count, a processing workload falling below a threshold workload level, a temperature sensed by temperature sensor 118 exceeding a maximum temperature as defined by the standard thermal profile, and/or other suitable condition. If the condition for operating with a reduced core count exists, method 300 may proceed to step 308. Otherwise, if the condition for operating with a reduced core count does not exist, method 300 may proceed to step 304.

At step 304, responsive to a determination that the condition for operating with a reduced core count does not exist, thermal controller 116 and/or another suitable component of information handling system 102 may enable all of cores 114. At step 306, thermal controller 116 may control processor 103 in accordance with a standard thermal profile defining a maximum operating temperature of processor 103 as a function of power consumed by processor 103. After completion of step 306, method 300 may proceed again to step 302.

At step 308, responsive to a determination that the condition for operating with a reduced core count exists, thermal controller 116 and/or another suitable component of information handling system 102 may disable one or more cores 114. At step 310, thermal controller 116 may control processor 103 in accordance with a modified thermal profile defining a maximum operating temperature of processor 103 as a function of power consumed by processor 103, wherein for a given power consumption of processor 103, the modified thermal profile defines a higher maximum temperature than that of the standard thermal profile. After completion of step 310, method 300 may proceed again to step 302.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media and executable on a processor or controller of information handling system 102.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
    a processor having a plurality of cores integrated within an integrated circuit package; and
    wherein the information handling system is configured to execute a thermal controller configured to:
    responsive to absence of a condition for operating the processor with a reduced core count, control the processor in accordance with a standard thermal profile defining a maximum operating temperature of the processor as a linear function of power consumed by the processor having a first slope; and
    responsive to presence of the condition for operating the processor with the reduced core count, control the processor in accordance with a modified thermal profile defining a modified maximum operating temperature of the processor as a linear function of power consumed by the processor having a second, greater slope, wherein for a given power consumption of the processor, the modified thermal profile defines a modified maximum temperature that is greater than the maximum operating temperature defined by the standard thermal profile;
    wherein the thermal controller is further configured to:
    while controlling the processor in accordance with the standard thermal profile: in response to the processor having a temperature exceeding the maximum operating temperature, causing the power consumption of the processor to be throttled; and
    while controlling the processor in accordance with the modified thermal profile:
    in response to the processor having a temperature exceeding the modified maximum operating temperature, causing the power consumption of the processor to be throttled.

2. The information handling system of claim 1, wherein the thermal controller is embodied in a management controller communicatively coupled to the processor.

3. The information handling system of claim 1, wherein the thermal controller is embodied in an operating system executable by the processor.

4. The information handling system of claim 1, wherein the condition for operating the processor with the reduced core count is based on a user configuration.

5. The information handling system of claim 1, wherein the condition for operating the processor with the reduced core count comprises a processing workload of the processor falling below a threshold workload level.

6. The information handling system of claim 1, wherein the condition for operating the processor with the reduced core count comprises a temperature of the processor exceeding a maximum temperature as defined by the standard thermal profile.

7. A method comprising, in an information handling system comprising a processor having a plurality of cores integrated within an integrated circuit package:
    responsive to absence of a condition for operating the processor with a reduced core count, controlling the processor in accordance with a standard thermal profile defining a maximum operating temperature of the processor as a linear function of power consumed by the processor having a first slope; and
    responsive to presence of the condition for operating the processor with the reduced core count, controlling the processor in accordance with a modified thermal profile defining a modified maximum operating temperature of the processor as a linear function of power consumed by the processor having a second, greater slope, wherein for a given power consumption of the processor, the modified thermal profile defines a modified maximum temperature that is greater than the maximum operating temperature defined by the standard thermal profile;
    while controlling the processor in accordance with the standard thermal profile, in response to the processor having a temperature exceeding the maximum operating temperature, causing the power consumption of the processor to be throttled; and while controlling the processor in accordance with the modified thermal profile, in response to the processor having a temperature exceeding the modified maximum operating temperature, causing the power consumption of the processor to be throttled.

8. The method of claim 7, wherein the condition for operating the processor with the reduced core count is based on a user configuration.

9. The method of claim 7, wherein the condition for operating the processor with the reduced core count comprises a processing workload of the processor falling below a threshold workload level.

10. The method of claim 7, wherein the condition for operating the processor with the reduced core count comprises a temperature of the processor exceeding a maximum temperature as defined by the standard thermal profile.

11. An article of manufacture comprising: a non-transitory computer-readable medium; and computer-executable instructions carried on the computer-readable medium, the instructions readable by a processor, the instructions, when read and executed, for causing the processor to:

responsive to absence of a condition for operating a processor having a plurality of cores integrated within an integrated circuit package with a reduced core count, controlling the processor in accordance with a standard thermal profile defining a maximum operating temperature of the processor as a linear function of power consumed by the processor having a first slope; and responsive to presence of the condition for operating the processor with the reduced core count, controlling the processor in accordance with a modified thermal profile defining a modified maximum operating temperature of the processor as a linear function of power consumed by the processor having a second, greater slope, wherein for a given power consumption of the processor, the modified thermal profile defines a modified maximum temperature that is greater than the maximum operating temperature defined by the standard thermal profile;

while controlling the processor in accordance with the standard thermal profile, in response to the processor having a temperature exceeding the maximum operating temperature, causing the power consumption of the processor to be throttled; and while controlling the processor in accordance with the modified thermal profile, in response to the processor having a temperature exceeding the modified maximum operating temperature, causing the power consumption of the processor to be throttled.

12. The article of claim 11, wherein the condition for operating the processor with the reduced core count is based on a user configuration.

13. The article of claim 11, wherein the condition for operating the processor with the reduced core count comprises a processing workload of the processor falling below a threshold workload level.

14. The article of claim 11, wherein the condition for operating the processor with the reduced core count comprises a temperature of the processor exceeding a maximum temperature as defined by the standard thermal profile.

* * * * *